(12) United States Patent
Sandstrom et al.

(10) Patent No.: US 7,937,481 B1
(45) Date of Patent: May 3, 2011

(54) SYSTEM AND METHODS FOR ENTERPRISE PATH MANAGEMENT

(75) Inventors: Harold M. Sandstrom, Belmont, MA (US); Amanuel Ronen Artzi, Framingham, MA (US); Helen S. Raizen, Jamaica Plain, MA (US); Michael E. Bappe, Loveland, CO (US)

(73) Assignee: EMC Corporation, Hopkinton, MA (US)

( * ) Notice: Subject to any disclaimer, the term of this patent is extended or adjusted under 35 U.S.C. 154(b) by 653 days.

(21) Appl. No.: 11/819,611

(22) Filed: Jun. 28, 2007

Related U.S. Application Data

(63) Continuation-in-part of application No. 11/475,060, filed on Jun. 27, 2006.

(51) Int. Cl.
*G06F 15/16* (2006.01)
*G06F 15/173* (2006.01)

(52) U.S. Cl. ......... 709/229; 709/219; 709/224; 709/238

(58) Field of Classification Search .................. 709/219, 709/224, 238, 229; 714/6, 13, 47
See application file for complete search history.

(56) References Cited

U.S. PATENT DOCUMENTS

| | | | |
|---|---|---|---|
| 7,111,084 B2 * | 9/2006 | Tan et al. .................... | 710/15 |
| 7,260,628 B2 * | 8/2007 | Yamamoto et al. .......... | 709/224 |
| 7,307,948 B2 * | 12/2007 | Infante et al. ................ | 709/219 |
| 7,349,961 B2 * | 3/2008 | Yamamoto ................... | 709/224 |
| 7,370,241 B2 * | 5/2008 | Nicholson et al. ............ | 714/47 |
| 7,376,764 B1 | 5/2008 | Todd | |
| 7,406,039 B2 * | 7/2008 | Cherian et al. ............... | 709/238 |
| 7,409,586 B1 * | 8/2008 | Bezbaruah et al. ............ | 714/13 |
| 7,565,570 B2 * | 7/2009 | Dohi .............................. | 714/6 |
| 7,617,320 B2 * | 11/2009 | Alon et al. .................... | 709/229 |
| 7,707,151 B1 | 4/2010 | Blumenau et al. | |
| 2002/0080445 A1 | 6/2002 | Falkenstein et al. | |
| 2002/0156918 A1 | 10/2002 | Valdevit et al. | |
| 2003/0210416 A1 | 11/2003 | Lewis et al. | |
| 2003/0236074 A1 | 12/2003 | Ishii et al. | |
| 2004/0210656 A1 | 10/2004 | Beck | |
| 2004/0260736 A1 | 12/2004 | Kern et al. | |
| 2005/0188126 A1 | 8/2005 | Mashima et al. | |
| 2005/0262562 A1 | 11/2005 | Gassoway | |
| 2006/0034181 A1 | 2/2006 | Noguchi et al. | |
| 2006/0165002 A1 | 7/2006 | Hicks et al. | |
| 2006/0209707 A1 | 9/2006 | Nakaya et al. | |
| 2006/0253526 A1 | 11/2006 | Welch et al. | |
| 2007/0055797 A1 | 3/2007 | Shimozono | |
| 2007/0093124 A1 | 4/2007 | Varney et al. | |
| 2007/0112974 A1 | 5/2007 | Shirogane et al. | |

(Continued)

OTHER PUBLICATIONS

U.S. Appl. No. 11/475,060, filed Jun. 27, 2006, file through Jan. 6, 2009.

(Continued)

*Primary Examiner* — Quang N. Nguyen
(74) *Attorney, Agent, or Firm* — Daly, Crowley, Mofford & Durkee, LLP

(57) ABSTRACT

Systems and methods are provided for disabling a device in an enterprise storage system. In one embodiment, a method comprises receiving information identifying a device in a storage area network that is scheduled for an outage. The method further determines one or more paths impacted by the outage of the device, generates a notification identifying the determined one or more paths, and transmits the notification to one or more hosts having paths to the device.

15 Claims, 7 Drawing Sheets

U.S. PATENT DOCUMENTS

| | | |
|---|---|---|
| 2007/0169186 A1 | 7/2007 | Ueoka et al. |
| 2007/0234113 A1 | 10/2007 | Komatsu et al. |
| 2008/0228987 A1 | 9/2008 | Yagi et al. |
| 2009/0257361 A1 | 10/2009 | Deshpande et al. |

OTHER PUBLICATIONS

Office Action dated Mar. 9, 2009 for U.S. Appl. No. 11/475,060, filed Jun. 27, 2006.

Response to Office Action dated Mar. 9, 2009 for U.S. Appl. No. 11/475,060, filed Jun. 27, 2006.

Office Action dated Sep. 30, 2009 for U.S. Appl. No. 11/475,060.

Response to Office Action Dated Sep. 30, 2009 (submitted Oct. 26, 2009) for U.S. Appl. No. 11/475,060, filed Jun. 27, 2006.

RSA Technology Solution Brief: Powerpath® Encryption with RSA: The EMC Solution for Securing Data in Enterprise Storage, 16 pages.

U.S. Appl. No. 11/819,612, filed Jun. 28, 2007, file through Apr. 27, 2010, 205 pages.

U.S. Appl. No. 11/475,060 USPTO Final Office Action dated Feb. 3, 2010, 12 pages.

U.S. Appl. No. 11/475,060 Response to USPTO Final Office Action dated Feb. 3, 2010 as filed, 8 pages.

http://enterprise.symantec.com, Data Sheet: Storage Management, Veritas CommandCentral™ Storage By Symantec, Centralized Visibility and Control Across Heterogeneous Storage Environments, pp. 1-4.

Sanscreen®, The Enabler for Storage service Management, Jan. 2006.

U.S. Appl. No. 11/475,060, filed Jun. 27, 2006, file through Sep. 23, 2010, 431 pages.

U.S. Appl. No. 11/819,612, filed Jun. 28, 2007, file from Apr. 27, 2010 through Sep. 23, 2010, 363 pages.

U.S. Appl. No. 11/819,609, filed Jun. 28, 2007, file through Sep. 27, 2010, 291 pages.

\* cited by examiner

SYSTEM AND METHODS FOR ENTERPRISE PATH MANAGEMENT

CROSS-REFERENCES TO RELATED APPLICATION

This application is a continuation-in-part of U.S. patent application Ser. No. 11/475,060, filed Jun. 27, 2006, the contents of which are incorporated herein by reference.

BACKGROUND

I. Technical Field

The present invention generally relates to the field of enterprise path management. More particularly, the invention relates to systems and methods for disabling and/or enabling one or more devices in a storage area network.

II. Background Information

Enterprise storage systems store data in large-scale environments and differ from consumer storage systems in both the size of the environment and the types of technologies that store and manage the data. A large-scale environment that stores data is typically referred to as a storage area network (SAN). SANs are commonly used in enterprise storage systems to transfer data between computer systems and storage devices. A typical SAN provides a communication infrastructure, including physical connections between devices, and a management layer, which organizes the connections, storage devices, and computer systems.

In a SAN environment, one or more servers provide services to other systems (e.g., clients) over the network. Servers in a SAN environment are typically referred to as hosts. Furthermore, each host connects to the SAN via one or more host bus adapters. A host bus adapter controls the transfer of data between the host and one or more target storage devices. In the case of a Fibre Channel SAN, the hosts may use special Fibre Channel host bus adapters and optical fiber for connections between devices.

SANs are frequently used in enterprise storage. A typical Fibre Channel SAN, for example, includes a number of Fibre Channel switches that are connected together to form a fabric or a network. An enterprise storage system may further include multiple disk drives that combine to form a disk array. A typical disk array includes a disk array controller, a cache, disk enclosures, and a power supply. Examples of disk arrays include the SYMMETRIX Integrated Cache Disk Array System the CLARIION Disk Array System, both available from EMC Corporation of Hopkinton, Mass. The disk array controller is a piece of hardware that provides storage services to computer systems that access the disk array and may attach to a number of disk drives that are located in the disk enclosures. For example, the disk drives may be organized into RAID groups for efficient performance. RAID (redundant array of inexpensive disks) is a system that uses multiple disk drives that share or replicate data among the drives. Accordingly, in a RAID system, instead of identifying several different hard drives, an operating system will identify all of the disk drives as if they are a single disk drive.

Furthermore, disk array controllers connect to a SAN via a port. A port serves as an interface between the disk array controller and other devices in the SAN. Each disk array controller typically includes two or more ports. Disk array controllers may communicate with other devices using various protocols, such as the SCSI (Small Computer System Interface) command protocol over a Fibre Channel link to the SAN. In the SCSI command protocol, each device is assigned a unique numerical identifier, which is referred to as a logical unit number (LUN). Communication using the SCSI protocol is said to occur between an "initiator" (e.g., a host) and a "target" (e.g., a disk drive) via a path. For example, a path may include a host bus adapter, an associated SCSI bus or Fibre Channel cabling providing a physical link, and a single port of a disk array controller. In a fully-redundant SAN, an alternate path is available for every level of device outages. Path management software is frequently used to manage SANs and, among other things, can detect load imbalances for disk array controllers in a SAN and can select alternate paths through which to route data. An example of path management software is EMC POWERPATH by EMC Corporation of Hopkinton, Mass.

As is evident from the foregoing discussion, a SAN environment may include a variety of devices, such as disk arrays including disk array controllers, switches, ports, host bus adapters, and physical links between the devices. When a device needs maintenance (e.g., repair or replacement), the device is taken offline. Taking a device in a SAN, such as a disk array controller or port offline, will cause input/output errors and path failures across a SAN for any hosts that access logical units through the offline device. These errors are often difficult to diagnose and may cause unnecessary corrective actions to occur. It is instead preferred to take the device offline with respect to an enterprise before the device is placed in an offline state. By taking a device offline with respect to an enterprise, such errors are avoided because data is rerouted to avoid the offline device. However, typical path management software does not provide functionality for disabling devices with respect to an entire enterprise.

In addition, devices in a SAN may fail unexpectedly, causing disruptions throughout an enterprise that are otherwise avoidable if, upon the failure, path management software could disable the failed device. As with planned outages, an unplanned device outage will cause input/output errors and path failures across a SAN for any hosts that access logical units through the failed device. It is instead preferred to detect the device failure and take the device offline with respect to an enterprise. Typical path management software, however, does not provide such functionality.

As is evident from the foregoing discussion, conventional path management software and techniques are limited and suffer from several drawbacks. Therefore, there is a need for improved systems and methods for managing paths in a SAN due to planned or unplanned device outages.

SUMMARY

Consistent with an embodiment of the present invention, a method is provided for disabling a device in an enterprise storage system. The method may comprise receiving information identifying a device in a storage area network that is scheduled for an outage; determining one or more paths impacted by the outage of the device; generating a notification identifying the determined one or more paths; and transmitting the notification to one or more hosts.

Consistent with another embodiment of the present invention, a method is provided for disabling a device in an enterprise storage system. The method may comprise detecting a device failure in a storage area network; receiving a notification identifying the device that experienced the failure; determining one or more paths that are affected by the device failure; and generating a notification identifying the determined one or more paths and transmitting the notification to one or more hosts.

Consistent with yet another embodiment of the present invention, a system is provided for disabling a device in an enterprise storage system. The system may comprise a storage area network, a plurality of hosts, and a path impact analysis server. The path impact analysis server may determine one or more paths impacted by a device outage or failure, generate a notification identifying the determined one or more paths, and transmit the notification to one or more of the plurality of hosts.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1:
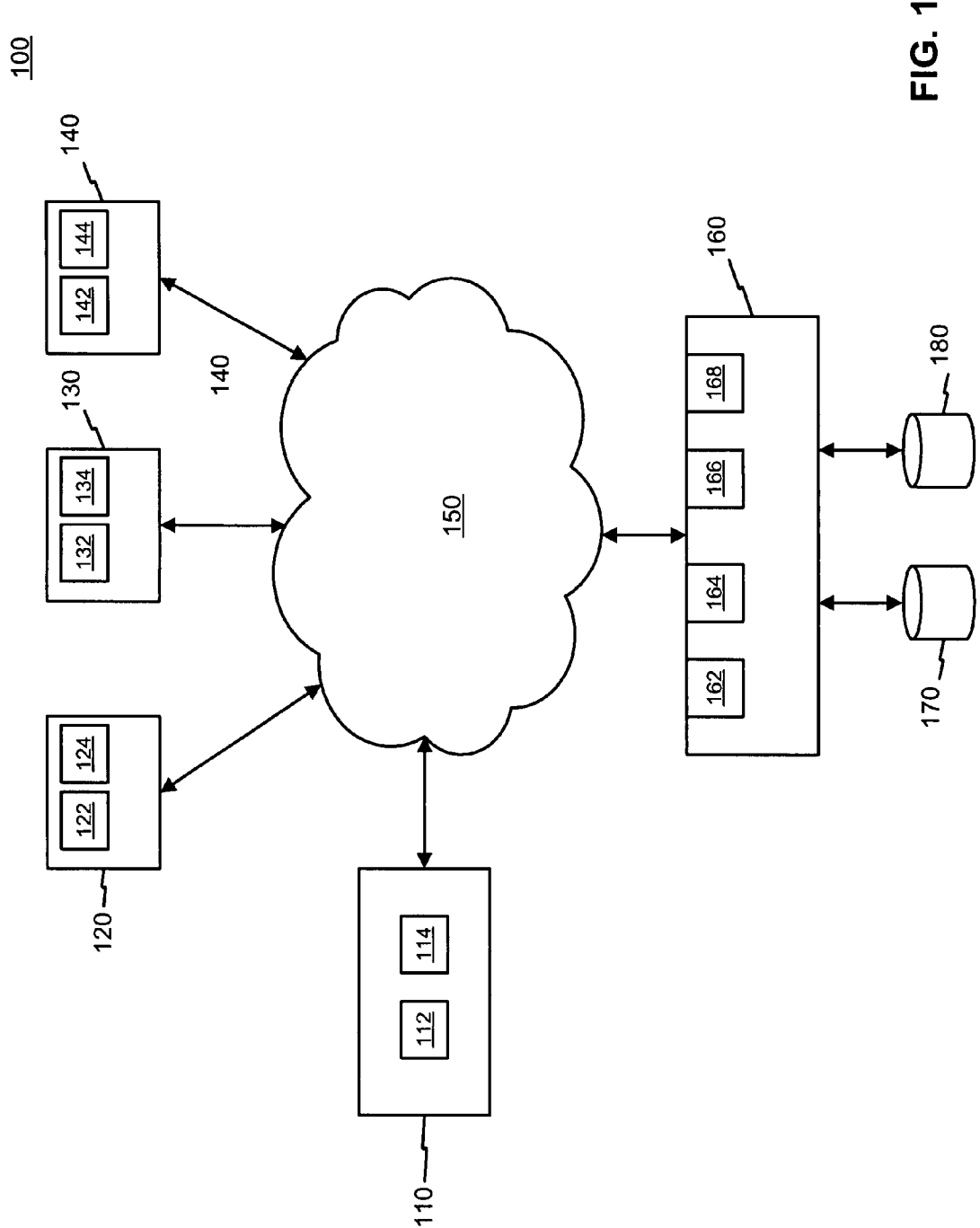
FIG. 1 illustrates an exemplary system for disabling an array port or an array controller for an enterprise, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

The methods and apparatus of the present invention are intended for use in storage area networks (SANs) that include data storage systems, such as the SYMMETRIX Integrated Cache Disk Array System or the CLARIION Disk Array System available from EMC Corporation of Hopkinton, Mass. and those provided by vendors other than EMC Corporation.

The methods and apparatus of the present invention may take the form, at least partially, of program code (i.e., instructions) embodied in tangible media, such as floppy diskettes, CD-ROMs, hard drives, random access or read only-memory, or any other machine-readable storage medium, including transmission medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. When implemented on a general-purpose processor, the program code combines with the processor to provide a unique apparatus that operates analogously to specific logic circuits. The program code (software-based logic) for carrying out the method is embodied as part of the system described below.

Systems and methods consistent with the present invention provide functionality for disabling an array port or an array controller for an enterprise. A disable tool may allow an administrator to disable the array port or the array controller for all hosts in the enterprise that have established paths to the disabled array port or array controller. For example, one or more hosts in a SAN may use software (e.g., EMC POWERPATH by EMC Corporation) for load balancing. Furthermore, the host may communicate with a management server. The management server may use software (e.g., STORAGE INSIGHT by EMC Corporation) to identify and handle errors and to identify path failures from hosts. STORAGE INSIGHT also provides functionality to model components and their relationships across networks, applications, and storage.

An administrator at a host may access the management server via, for example, a graphical user interface (GUI). Furthermore the administrator may transmit a notification to the management server that a particular array port or a particular array controller is no longer available. The management server may then access a configuration table to determine which host or hosts have paths established to the unavailable array port or array controller. The management server may transmit a command to the identified hosts to disable all paths to the unavailable array port or array controller. Furthermore, the management server may transmit a re-enable command to the identified hosts in order to re-enable the disabled array port or array controller.

FIG. 1 illustrates an exemplary system 100 for disabling an array port or an array controller for an enterprise, consistent with an embodiment of the present invention. As shown in system 100, management server 110, hosts 120, 130, and 140, and array controller 160 are connected to SAN 150. One of skill in the art will appreciate that although one management server, three hosts, and one array controller are depicted in FIG. 1, any number of servers, hosts, and array controllers may be provided. Furthermore, one of ordinary skill in the art will recognize that functions provided by one or more components of system 100 may be combined.

Storage area network (SAN) 150 provides communications between the various entities in system 100, such as management server 110, hosts 120-140, and array controller 160. SAN 150 may be a shared, public, or private network and encompasses a wide area or local area. SAN 150 may be implemented through any suitable combination of wired and/or wireless communication networks. Furthermore, SAN 150 may include a local area network (LAN), a wide area network (WAN), an intranet, or the Internet.

Management server 110 may comprise a general purpose computer (e.g., a personal computer, network computer, server, or mainframe computer) having a processor 112 that may be selectively activated or reconfigured by a computer program to perform one or more methods consistent with the present invention. Management server 110 may also be implemented in a distributed network. Alternatively, management server 110 may be specially constructed for carrying-out methods consistent with the present invention. Furthermore, management server 110 may include a data storage 114 for storing a configuration table and program modules that implement a program for disabling an array port or an array controller for an enterprise. Program modules for implementing the program are discussed in further detail with respect to FIG. 2.

Array controller 160 is connected to SAN 150 via ports 162, 164, 166, and 168. Ports 162-168 serve as interfaces between array controller 160 and other devices in SAN 150. Array controller 160 is also connected to disk drives 170 and 180, which may be enclosed in one or more disk enclosures (not shown). Each of disk drives 170 and 180 may be uniquely identified by a LUN. Array controller 160 may communicate with other devices using various protocols, such as the SCSI command protocol over a Fibre Channel link to SAN 150.

Hosts 120-140 may be any type device for communicating with management server 110 over SAN 150. For example, hosts 120-140 may be personal computers, handheld devices, servers, or any other appropriate computing platform or device capable of exchanging data with SAN 150. Hosts 120-140 may each include a processor (i.e., processors 122, 132, and 142) and a data storage (i.e., data storages 124, 134, and 144). Further, each of hosts 120-140 may include one or more host bus adapters (not shown) to connect with SAN 150.

Hosts 120-140 may execute program modules that provide one or more graphical user interfaces (GUIs) for interacting with management server 110. Users may access management server 110 via SAN 150 through a web browser or software application running on, for example, any one of hosts 120-140. For example, a web portal may include options for allowing a user to log onto a secure site provided by management server 110 by supplying credentials, such as a username and a password. Once logged onto the site, the web portal may display a series of screens prompting the user to make various selections for disabling an array port or an array controller. Since embodiments of the present invention may be implemented using an HTTPS (hypertext transfer protocol secure) environment, data transfer occurs in a secure fashion.

Consistent with an aspect of the present invention, a web interface generated by management server 110 that is displayed to users of hosts 120-140 may provide various options. For example, a user may select, using the web interface, a tool for disabling an array port or an array controller. In other embodiments, users of hosts 120-140 may select the disable tool from a GUI generated by software executing on one of hosts 120-140.

Consistent with an embodiment of the present invention, the disable tool is made available to management server 110 by a remote application programming interface (API) executing on any one of hosts 120-140. An API is an interface that an application on a host implements in order to allow other computer programs to request a service. Further, an API allows data to be exchanged between the application and the other computer program. Using one of hosts 120-140, an administrator, for example, may transmit a notification to management server 110 indicating that a particular array port or array controller is unavailable.

Furthermore, management server 110 may use a configuration table stored in data storage 114 to identify hosts that have paths to an array port or an array controller that a user has identified as being unavailable. In particular, a port or controller may be identified by its port or controller number, product identification number, array serial number, and array vendor name. Management server 110 may transmit a command to the identified hosts indicating that paths to the unavailable array port or array controller should be disabled. Furthermore, management server 110 may reverse the process by transmitting a re-enable command to the identified hosts indicating that the paths to the array port or array controller should be re-enabled.

Figure 2:
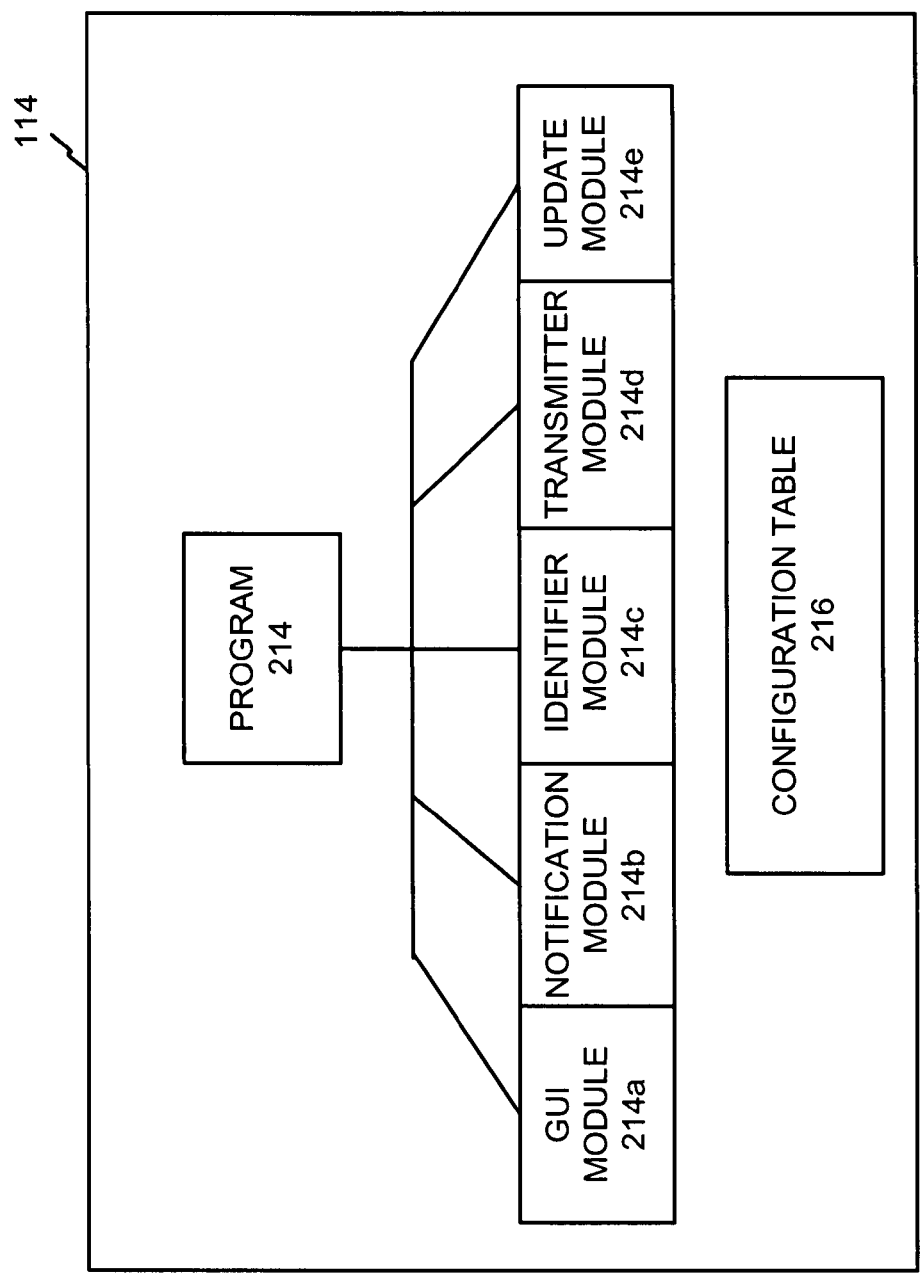
FIG. 2 shows an exemplary software architecture for providing a disable tool for an enterprise, consistent with an embodiment of the present invention.

FIG. 2 shows an exemplary software architecture for providing a disable tool for an enterprise, consistent with an embodiment of the present invention. An administrator may use the disable tool to disable an array port or an array controller in a SAN. The software architecture may be stored in data storage 114, as shown in FIG. 1, for example. In one embodiment, data storage 114 stores instructions of program 214, which when executed, perform the functions of the disable tool. Furthermore, data storage 114 may also store a configuration table 216.

To implement the disable tool, program 214 may include instructions in the form of one or more software modules 214a-214e. Software modules 214a-214e may be written using any known programming language, such as C++, XML, etc. As shown in FIG. 2, software modules 214a-214e include GUI module 214a, notification module 214b, identifier module 214c, transmitter module 214d, and update module 214e. Each of modules 214a-214e is discussed below in further detail.

GUI module 214a may provide processing to display data and receive data selections from users of hosts 120-140. For example, GUI module 214a may generate a GUI used by an administrator at one of hosts 120-140 to select one or more ports 162-168 or array controller 160. The GUI may provide drop down lists or check boxes for selecting an array port or an array controller included in SAN 150.

Notification module 214b may receive a user notification that one or more ports or an array controller is unavailable. For example, an administrator at one of hosts 120-140 may send a notification that a particular array port is unavailable. Accordingly, any hosts having a path to the unavailable array port or array controller should be disabled.

Identifier module 214c may identify hosts that have paths to a particular array port or array controller that an administrator identified as being unavailable in the notification. To determine which of hosts 120-140 have one or more paths to an unavailable array port or array controller, identifier module 214c may examine data stored in configuration table 216 included in data storage 114. Configuration table 216 may store status information of hosts in a SAN, such as which hosts have established paths to a particular array port or array controller. For example, configuration table 216 may indicate, for each host, all paths that the host has established and the target array port or target array controller of each path.

Transmitter module 214d may transmit a command to one or more of hosts 120-140 indicating that paths to a particular array port or an array controller should be disabled. An array port or array controller may be identified by its port or controller number, product identification number, array serial number, and array vendor name. The command may include the identification information and indicate that the host should disable all paths to the array port or array controller specified by the identification information. Furthermore, transmitter module 214d may transmit a command to one or more of hosts 120-140 in order to re-enable paths to an array port or array controlled. For example, the command may include the identification information discussed above and may indicate that a particular host or hosts should re-enable all paths to an array port or array controller specified by the identification information.

Update module 214e may save updates of hosts that have established new paths to configuration table 216. For example, update module 214e may receive information indicating new paths that have been established to certain ports and/or certain array controllers. Accordingly, update module 214e may store current host configuration data in configuration table 216 in order to reflect newly established paths.

While the example provided in FIG. 2 shows program modules 214a-214e and configuration table 216 as being resident in data storage 114 of management server 110, one of ordinary skill in the art will appreciate that program modules 214a-214e and/or configuration table 216 may be stored in data storages 124, 134, and 144 of any one of hosts 120, 130, or 140, for example.

Figure 3:
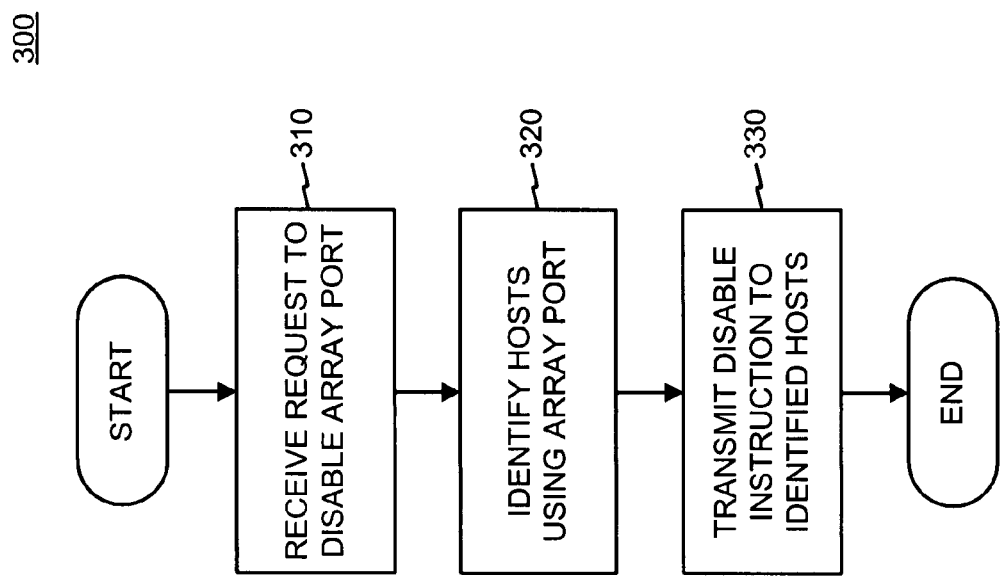
FIG. 3 is a flow diagram of an exemplary method for disabling an array port for an enterprise, consistent with an embodiment of the present invention.

Referring now to FIG. 3, a flow diagram 300 is provided of an exemplary method for disabling an array port for an enterprise, consistent with an embodiment of the present invention. The method describes a process for disabling an array port based on a configuration table stored by a management server. The configuration table is used to identify one or more hosts having a path to an array port that a user has indicated is unavailable. Accordingly, the management server may transmit a disable command to the hosts having paths to the unavailable array port.

At the start of the process, a user may transmit a notification from one of hosts 120-140 to management server 110. (Step 310). The notification may specify one of ports 162-168 of array controller 160, which has become unavailable. For example, the port may have experienced a failure or an administrator may wish to take the port offline. The notification may identify the port by port number, product identification number, array serial number, and array vendor name. The process then proceeds to step 320.

In step 320, management server 110 may identify which of hosts 120-140 have paths to the port that is unavailable. As part of this step, management server 110 may examine data stored in configuration table 216 that indicates which hosts are connected to which array ports. For example, configuration table 216 may store status information of hosts 120-140, such as the paths from each of hosts 120-140 to ports 162-168.

Next, management server 110 may transmit a command to one or more of hosts 120-140 that were identified in step 320. (Step 330). For example, the command may indicate that paths from the identified hosts to the unavailable array port should be disabled. In order for the host to identify the port, the command may identify the port by port number, product identification number, array serial number, and array vendor name. The one or more hosts having paths to the unavailable array port may then disable appropriate paths. The process then ends.

In other implementations of the above process, in step 310, the notification may specify an array controller, such as array controller 160, which should have all of its ports disabled (i.e., ports 162, 164, 166, and 168). Furthermore, during the above process, when a user specifies that a particular port should be disabled, management server 110 may optionally prompt the user to indicate whether to also disable all ports of the array controller having the specified port. For example, referring again to FIG. 1, a user at host 120 may disable port 162 of array controller 160. Management server 110 may then transmit a notification to host 120 indicating that port 162 is part of array controller 160. Furthermore, the notification may ask the user at host 120 to respond whether the user wishes to disable the entire array controller 160 (i.e., also disable ports 164, 166, and 168). When a user responds affirmatively, in step 330, management server 110 may transmit a command to all hosts having paths to the array controller 160 indicating that ports 162-168 should be disabled. One of ordinary skill in the art will appreciate that these and other modifications to the process are consistent with the spirit and scope of the present invention.

In still other implementations of the present invention, the above process may be reversed through the use of a re-enable command. For example, in step 310, the notification transmitted by a user from one of hosts 120-140 to management server 110 may specify one of ports 162-168 of array controller 160 that should be re-enabled. Further, in step 320, management server 110 may instead identify which of hosts 120-140 previously had paths to the specified port. Accordingly, in step 330, the command transmitted to one or more of the identified hosts 120-140 may indicate that paths from the identified hosts to the unavailable array port should be re-enabled.

Accordingly, systems and methods consistent with the present invention provide a tool for disabling an array port or an array controller for an enterprise. For example, in one implementation, a system disables an array port in an enterprise storage system. The system comprises a storage area network (SAN), a plurality of hosts, an array controller comprising a plurality of array ports, and a management server. The management server receives a request to disable an identified one of the plurality of array ports and identifies, from a configuration table stored in the management system server, one or more of the plurality of hosts having at least one path to the identified array port. The management server transmits an instruction to the one or more of the plurality of hosts to disable paths to the identified array port. Subsequently, the management server may transmit an instruction to the one or more of the plurality of hosts to re-enable paths to the identified array port.

Additional embodiments of the present invention, which are now discussed in further detail, provide functionality for disabling a device in a SAN. For example, systems and methods disclosed herein may disable appropriate paths due to outages or failures of devices in a SAN. Devices may include disk arrays and disk array controllers, switches, ports, host bus adapters, and physical links between the devices. Furthermore, consistent with disclosed embodiments, a tool may allow an administrator to disable appropriate paths to an unavailable device across all hosts in an enterprise that have established paths to the unavailable device.

As discussed above in connection with FIGS. 1-3, management server 110 may implement functionality consistent with one or more disclosed embodiments for array controller or array port failures or outages. Embodiments discussed below extend such functionality for additional device failures or outages. Furthermore, as discussed below in further detail, functionality provided by management server 110 may be provided by a plurality of servers, such as shown with reference to FIG. 4.

Figure 4:
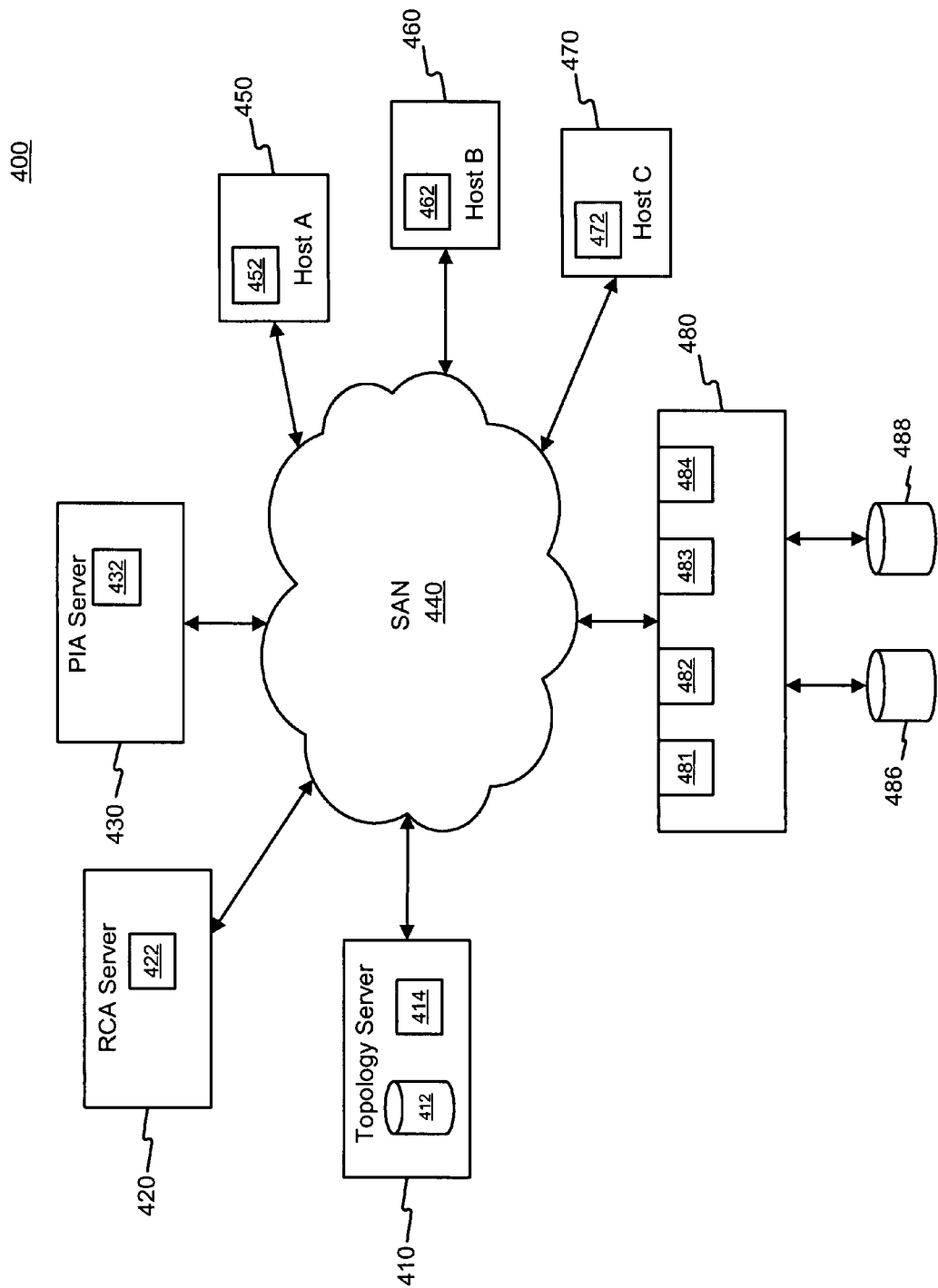
FIG. 4 illustrates an exemplary system for disabling or enabling a device for an enterprise, consistent with an embodiment of the present invention.

FIG. 4 illustrates an exemplary system 400 for disabling or enabling a device for an enterprise, consistent with an embodiment of the present invention. In disclosed embodiments, system 400 may disable a device during a planned or unplanned device outage. For example, a planned outage refers to a scenario in which the device is taken offline for repair, maintenance, or replacement. An unplanned outage refers to a scenario in which the device fails unexpectedly or is determined to have suffer degraded performance in which it may be beneficial to take the device offline.

As shown in system 400, topology server 410, root cause analysis (RCA) server 420, path impact analysis (PIA) server 430, hosts 450, 460, and 470, and array controller 480 are connected to SAN 440. As discussed above, one of skill in the art will appreciate that functionality provided by topology server 410, RCA server 420, and PIA server 430, may be consolidated and provided by a single server (e.g., management server 110) or functionality may be divided among a plurality of servers (e.g., as shown in FIG. 4). Furthermore, although three hosts and one array controller are depicted in FIG. 4, any number of hosts and array controllers may be provided. Still further, SAN 440 may include additional devices, such as switches, for example.

Storage area network (SAN) 440 provides communications between the various entities in system 400, such as topology server 410, root cause analysis (RCA) server 420, path impact analysis (PIA) server 430, hosts 450-470, and array controller 480. SAN 140 may be a shared, public, or private network, may encompasses a wide area or local area, and may be implemented through any suitable combination of wired and/or wireless communication networks. Furthermore, SAN 440 may include a local area network (LAN), a wide area network (WAN), an intranet, or the Internet.

Hosts 450-470 may be any type device for communicating with PIA server 430 over SAN 440. For example, hosts 450-470 may be personal computers, handheld devices, servers, or any other appropriate computing platform or device capable of exchanging data with SAN 440. Hosts 450-470 may each include a processor (not shown) and memories 452, 462, and 472. For example, memories 452, 462, and 472 of hosts 450, 460, and 470, respectively, may store path management software. Furthermore, each of hosts 450-470 may include one or more host bus adapters (not shown) to connect with SAN 440.

Hosts 450-470 may execute program modules that provide one or more graphical user interfaces (GUIs) for interacting with PIA server 430. Users may access PIA server 430 via SAN 440 through a web browser or software application running on, for example, any one of hosts 450-470. Furthermore, the data storage of one or more of hosts 450-470 may store path management software for managing paths to storage devices in system 400. As referenced earlier, EMC POWERPATH by EMC Corporation of Hopkinton, Mass., is an example of path management software. However, any host-based path management software that provides alternative paths to and between hosts and LUNs is in keeping with the spirit and scope of the present invention.

Topology server 410 includes database 412, which may store information such as the configuration table discussed in connection with FIGS. 1-3, and a discovery engine 414. Discovery engine 414 may provide logic for discovering devices in SAN 440 as well as relationships between devices. Discovery engine 414 may store data concerning discovered devices and relationships in database 412. For example, database 412 may store identifiers for the devices and/or store records indicating relationships between devices in SAN 440. Furthermore, topology server 410 may be accessed by RCA server 420 and/or PIA server 430.

RCA server 420 may determine whether there is a fault in a device in SAN 440. For example, a fault module 422 included in RCA server 420 may determine that there has been a failure of an array port or controller, host bus adapter card port, cable, switch, gateway, or array, for example. In the event of a failure of a device, fault module 422 may generate an alert describing the failed device. In some implementations fault module 422 may be unable to determine whether a device has failed or is degraded. In such circumstances, fault module 422 may generate an appropriate alert describing the determined status of a device (e.g., degraded). RCA server 420 may transmit the alert, which includes information identifying failed or degraded devices, to PIA server 430. Furthermore, RCA server 420 may periodically transmit status information to PIA server 430.

PIA server 430 receives information from RCA server 420 and coordinates the disabling and enabling of multi-pathing managed SAN devices, such as array and host bust adapter ports SAN-wide. For example, PIA server 430 may receive information from RCA server 420 on a period basis or upon the event of a device failure. Furthermore, PIA server 430 may access database 412 of topology server 410 in order to determine other devices which may be affected by an outage. PIA server 430 may include an analysis module 432, which may provide logic for analyzing data retrieved and/or received from topology server 410 and/Or RCA server 420. Analysis module 432 may further provide appropriate functionality for interfacing with any one of hosts 450-470.

For example, in the event of an unplanned outage, PIA server 430 may receive notifications of device failures from RCA server 420. Analysis module 432 may then analyze one or more of the notifications received from RCA server 420 in order to determine which path or paths are affected by the outage. Furthermore, analysis module 432 may transmit a notification to path management software executing on one of hosts 450-470 that identifies which path or paths to disable (or enable) for the enterprise.

In the event of a planned outage, PIA server 430 may receive a notification from a SAN administrator that indicates which device or devices are scheduled for maintenance and are being taken offline. Using that information, analysis module 432 may refer to data retrieved from topology server 420 in order to determine which path or paths are affected by the device outage. After PIA server 430 determines the affected path or paths, analysis module 432 transmits a notification (e.g., an alert) to, or performs a remote set operation via, path management software on one of hosts 450-470 identifying which path or paths to disable for the enterprise.

As discussed above, SAN 440 may include any combination of devices, such as switches, arrays, etc. For purposes of illustration, FIG. 4 includes array controller 480. Array controller 480 is connected to SAN 440 via ports 481, 482, 483, and 484. Ports 481-484 serve as interfaces between array controller 480 and other devices in SAN 440. Array controller 480 is connected to disk drives 486 and 488. Disk drives 486-488 may be enclosed in one or more disk enclosures (not shown). Each of disk drives 486-488 may be uniquely identified by a LUN. Furthermore, array controller 480 may communicate with other devices using various protocols, such as the SCSI command protocol over a Fibre Channel link to SAN 440.

As discussed earlier, PIA, server 430 may handle planned and unplanned outages of devices in SAN 440. In the case of planned outages, PIA server 430 may receive a notification from one of hosts 450-470. Furthermore, in a planned outage PIA server 430 may access information stored by topology server 410. For example, PIA server 430 may access a configuration table (as discussed in connection with FIGS. 1-3) stored in database 412 to determine which host or hosts have paths established to the unavailable device. PIA server 430 may then transmit a command to the identified hosts to disable all paths to the unavailable device. Furthermore, PIA server 430 may transmit a re-enable command to the identified hosts in order to re-enable the disabled device once it is ready to be enabled.

The notification transmitted to path management software executing on the identified host or hosts may identify a path corresponding to the device that has experienced an outage or that has been taken offline. To identify a path, a host port world-wide name, an array port world-wide name, and a LUN storage world-wide name are identified by PIA server 430. Furthermore, when identifying a path, PIA server 430 may transmit a "state" of the identified path. States include an "alive" state, a "dead" state, a "degraded" state, and a "warning" state. The "alive" state indicates that a path is currently operating and the "dead" state indicates a path is not operating. The "degraded" state indicates that a path is not operating as expected. The "warning" state is used in situations where a path is experiencing symptoms of operating difficulties, but PIA server 430 cannot determine whether the path is degraded or dead.

In the case of unplanned outages, PIA server 430 may receive a notification from RCA server 420 identifying a device that has experienced a failure. Furthermore, PIA server 430 may access information stored by topology server 410. For example, PIA server 430 may access a configuration table (as discussed in connection with FIGS. 1-3) stored in database 412 to determine which host or hosts have paths established to the unavailable device. PIA server 430 may then transmit a command to the identified hosts to disable all paths to the unavailable device. Furthermore, PIA server 430 may transmit a re-enable command to the identified hosts in order to re-enable the disabled device once it is ready to be enabled.

When disabling or enabling a device, PIA server 430 may transmit a notification to path management software executing on the identified host or hosts having paths established to the device. As discussed above, path management software may be stored in memories 452, 462, and 472 of hosts 450, 460, and 470, respectively. The path management software may automatically disable identified paths or may require human intervention prior to disabling paths. For example, an administrator at one of hosts 450-470 may decide whether or not to take a particular device offline with respect to an enterprise after receiving an alert. In other embodiments, the path management software may include logic for deciding when to take devices offline automatically. For example, in the event of a failure of a device, the device may be taken offline automatically, but in the event that a device has experienced degraded performance, the path management software may require a user, such as the administrator to command that the device be disabled for the enterprise.

Figure 5A:
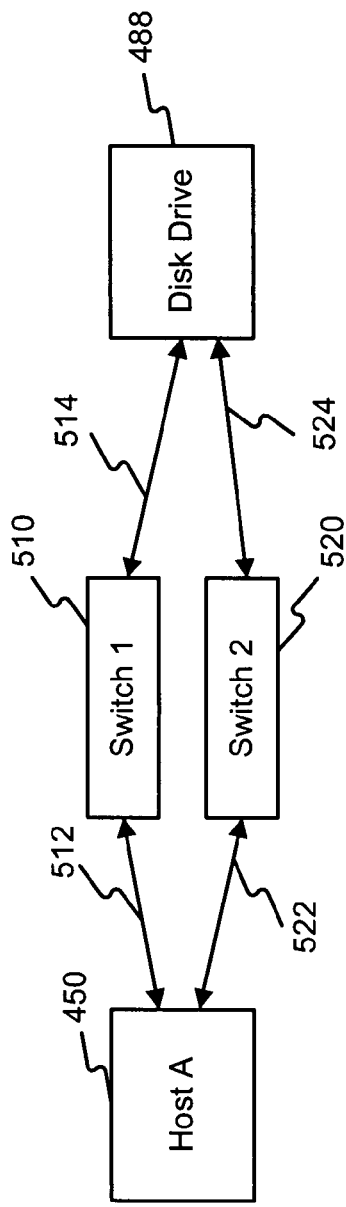
FIG. 5A illustrates switches in communication with a host system and a storage system, consistent with an embodiment of the present invention.

FIG. 5A illustrates switches in communication with a host system and a storage system, consistent with an embodiment of the present invention. As shown in FIG. 5A, switches 510 and 520 are connected by data links 512-514 and 522-224, respectively, with host 450 and disk drive 488. Accordingly, switches 510 an 520 and data links 512-514 and 522-524 may be included in SAN 440, of FIG. 4, for example. In FIG. 5A, switches 510 and 520 are active and have not experienced failures and have not been taken offline during a planned outage. Furthermore, switch 510 and data links 512-514 together may constitute a "path" from host 450 to disk drive 488. For purposes of clarity, array controller 480 and ports 481-484 are not shown in FIG. 5A.

Figure 5B:
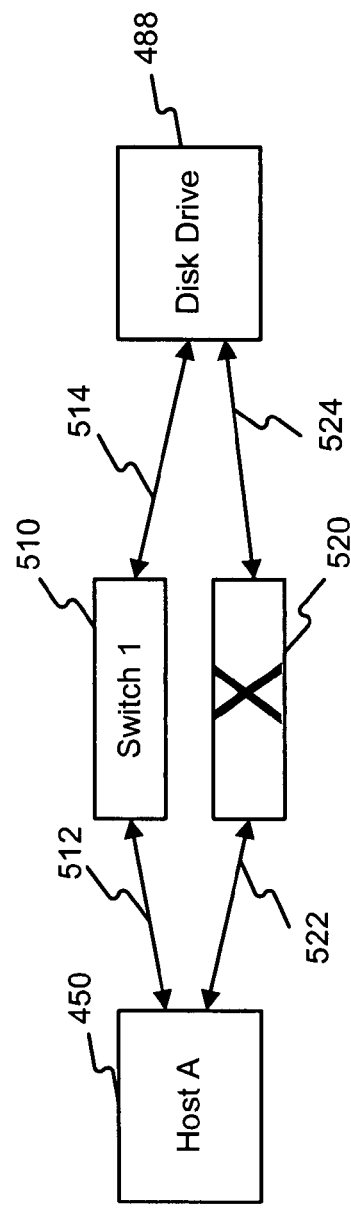
FIG. 5B illustrates switches in communication with a host system and a storage system in which one of the switches is disabled, consistent with an embodiment of the present invention.

FIG. 5B illustrates switches in communication with a host system and a storage system in which one of the switches is unavailable, consistent with an embodiment of the present invention. For example, in FIG. 5B, switch 520 has either experienced a failure or has been taken offline, as is represented by the "X" shown in switch 520. In the event of a failure of switch 520, RCA server 420 may identify the outage and PIA server 430 may generate an alert to path management software executing on host 450 because host 450 has at least one path through switch 520. Accordingly, the path management software managing host 450 may either automatically or at an administrator's discretion, cease to route data via switch 520 and data links 522-524. For example, host 450 may route data only via switch 510 and data links 510-512. In the event that switch 520 has been taken offline during a planned outage, PIA server 430 may transmit a notification of the affected path (i.e., switch 520 and data links 510-512) to the path management software executing on host 450.

Figure 6:
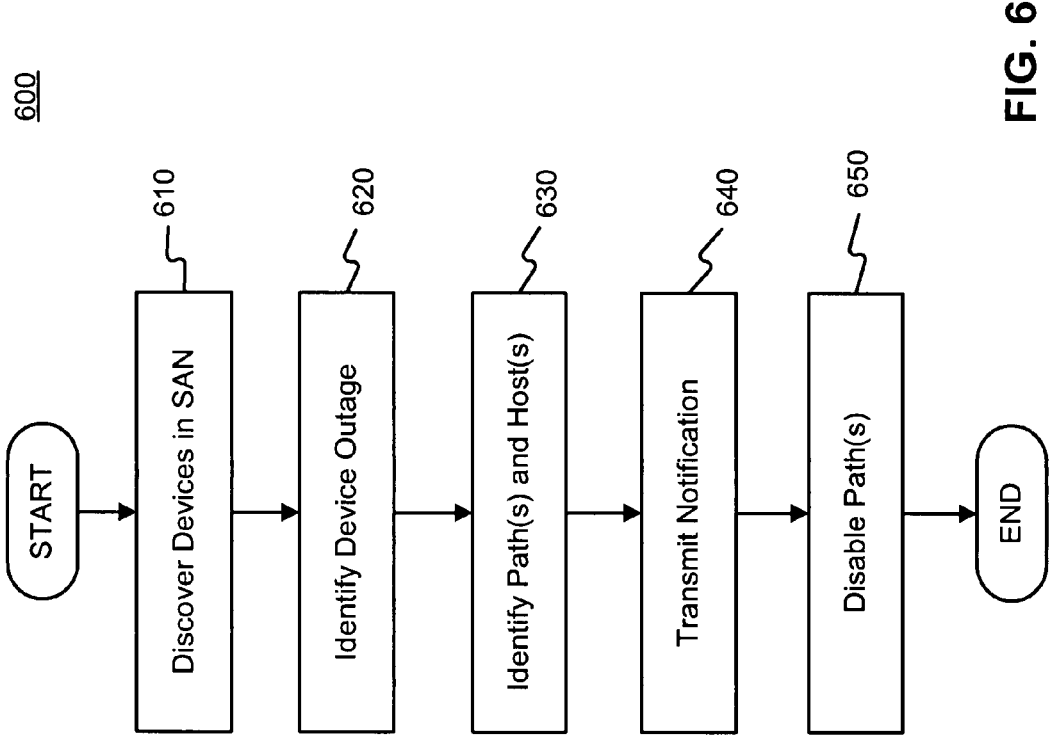
FIG. 6 is a flow diagram of an exemplary method for disabling a device in an enterprise during a planned outage, consistent with an embodiment of the present invention.

FIG. 6 is a flow diagram of an exemplary method for disabling a device in an enterprise during a planned outage, consistent with an embodiment of the present invention. During a planned outage, an administrator may decide to take a device offline for repair, maintenance, or replacement.

In step 610, topology server 410 discovers devices in SAN 440. For example, topology server, via discovery engine 414, may identify various devices in SAN 440, such as disk arrays and disk array controllers, switches, ports, host bus adapters, and physical links between the devices, as well as relationships between devices. Discovery engine 414 may store data concerning discovered devices and relationships in database 412. For example, database 412 may store identifiers for the devices and/or store records indicating relationships between devices in SAN 440. The process proceeds to step 620.

Next, in step 620, PIA server 430 may receive information identifying a device that has been scheduled for an outage by an administrator. A tool executing on one of hosts 450-470, for example, may transmit the notification to PIA server 430 at an administrator's direction or automatically (e.g., according to a planned outage schedule). The process proceeds to step 630.

In step 630, PIA server 430 determines which paths are affected by the device outage. To do so, PIA server 430 may access database 412 of topology server 410 in order to determine relationships between devices in SAN 440. For example, PIA server 430 may identify a path by identifying by a starting point and an end point of the path. To fully identify a path, analysis module 432 of PIA server 430 may identify a host port world-wide name, an array port world-wide name, and a LUN storage world-wide name corresponding to the path. Analysis module 432 may also determine a "state" of the identified path, such as one of "alive," "dead," "degraded," or "warning" states. Furthermore, PIA server 430 may use information stored by topology server 410 to identify a host or hosts that are using paths affected by the device outage. For example, PIA server 430 may determine that host 450 is using an affected path, but host 460 is not using the affected path. As another example, PIA server 430 may determine that both hosts 450 and 460 are using an affected path. One of ordinary skill in the art will recognize that these are merely exemplary and PIA server 430 may determine any one or more hosts 450-470 are using an affected path by referring to data stored by topology server 410. The process proceeds to step 640.

In step 640, PIA server 430 sends a notification to the path management software executing on the identified one or more of hosts 450-470. The notification may include the host port world-wide name, array port world-wide name, and LUN storage world-wide name corresponding to the path, as well as the "state" of the path. The process proceeds to step 650.

In step 650, an administrator at one or more of hosts 450-470 may receive an alert from PIA server 430 indicating that one or more paths are affected by the outage. The administrator may decide to manually disable one or more affected paths by issuing a command to the path management software executing on the host. Alternatively, or in addition, upon receipt of the alert, path management software on the affected host may automatically disable the one or more affected paths. The process then ends.

Figure 7:
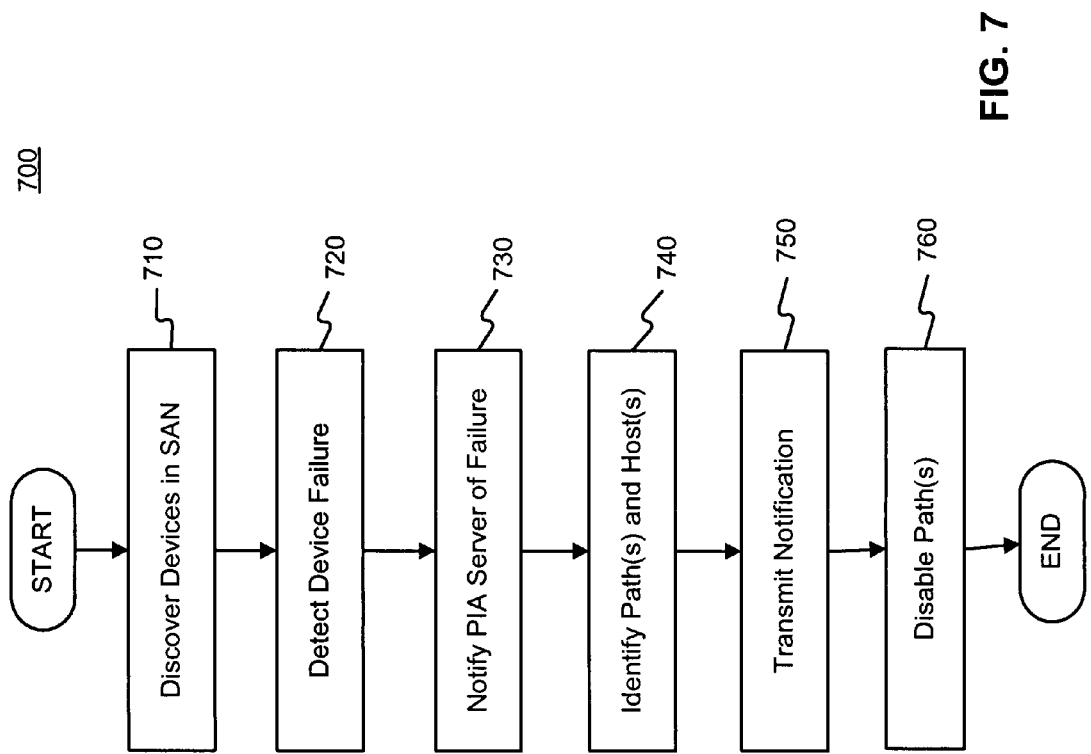
FIG. 7 is a flow diagram of an exemplary method for disabling a device in an enterprise during an unplanned outage, consistent with an embodiment of the present invention.

FIG. 7 is a flow diagram of an exemplary method for disabling a device in an enterprise during an unplanned outage, consistent with an embodiment of the present invention. During an unplanned outage, a device may experience a failure unexpectedly and cause a path to fail or suffer degraded performance.

In step 710, topology server 410 discovers devices in SAN 440. For example, topology server, via discovery engine 414, may identify various devices in SAN 440, such as disk arrays and disk array controllers, switches, ports, host bus adapters, and physical links between the devices, as well as relationships between devices. Discovery engine 414 may store data concerning discovered devices and relationships in database 412. For example, database 412 may store identifiers for the devices and/or store records indicating relationships between devices in SAN 440. The process proceeds to step 720.

In step 720, RCA server 420 monitors devices in SAN 440 for failures and, if a device experiences a failure, transmits a notification to PIA server 430. For example, fault module 422 of RCA server 420 may determine that there has been a failure of an array port or controller, host bus adapter card port, cable, switch, gateway, or array, for example. In the event of a failure of a device, fault module 422 may generate an alert describing the failed device. In some implementations fault module 422 may be unable to determine whether a device has failed or is degraded. In such circumstances, fault module 422 may generate an appropriate alert describing the determined status of a device (e.g., degraded). The process proceeds to step 730.

Next, in step 730, PIA server 430 may receive information identifying a device that has experienced a failure from RCA server 420. For example, upon detecting a failure or suspected degradation of a device, RCA server 420 may transmit a notification to PIA server 430. The process proceeds to step 740.

Next, in step 740, PIA server 430 determines which paths are affected by the device outage. To do so, analysis module 432 of PIA server 430 may access database 412 of topology server 410 in order to determine relationships between devices in SAN 440. For example, PIA server 430 may identify a path by identifying by a starting point and an end point of the path. Furthermore, PIA server 430 may identify a host port world-wide name, an array port world-wide name, and a LUN storage world-wide name corresponding to the path. PIA server 430 may also determine a "state" of the identified path, such as one of "alive," "dead," "degraded," or "warning" states based on state information received from, for example, RCA server 420. Furthermore, PIA server 430 may use information stored by topology server 410 to identify a host or hosts that are using paths affected by the device experiencing the outage. The process proceeds to step 750.

In step 750, PIA server 430 sends a notification to path management software executing on the identified host or hosts. The notification may include the host port world-wide name, array port world-wide name, and LUN storage world-wide name corresponding to the path. The notification may also include information describing the "state" of the path, as discussed above. The process proceeds to step 760.

In step 760, an administrator at one of hosts 450-470 may receive an alert from PIA server 430 indicating that one or more paths are affected by the outage. The administrator may decide to manually disable one or more affected paths by issuing a command to the path management software executing on the host. Alternatively, or in addition, upon receipt of the alert, the path management software may automatically disable the one or more affected paths. Furthermore, in the event that multiple hosts are affected by the device outage, more than one host may receive the alert. The process then ends.

According to embodiments of the present invention, a command from PIA server 430 may cause path management software to disable all paths to a particular device during a planned or unplanned outage. For example, consistent with disclosed embodiments, path management software may disable paths due to outages of devices, such as disk arrays and disk array controllers, switches, ports, host bus adapters, and physical links between the devices. Furthermore, if a host bus port fails, PIA server may disable paths through the affected host bus port. In other embodiments, path management software executed on the host may disable a sub-path.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method, comprising:
    disabling a device in an enterprise storage system, the disabling comprising:
        receiving information identifying a device in a storage area network that is scheduled for an outage;
        determining one or more paths impacted by the scheduled outage of the device;
        designating a path of the one or more paths that is operating as being in an alive state;
        designating a path of the one or more paths that is not operating as being in a dead state;
        designating a path of the one or more paths that is not operating as expected as being in a degraded state;
        designating a path of the one or more paths that is experiencing problems and it cannot be determined if the path is in the degraded state or the dead state as being in a warning state;
        generating a notification identifying the one or more paths, the notification comprising the designated state of each of the one or more paths; and
        transmitting the notification to one or more hosts.

2. The method of claim 1, wherein the device that experienced the outage is an array port, array controller, host bus adapter, switch, or transmission media.

3. The method of claim 1, further comprising determining the one or more paths by accessing a database of a topology server that stores data identifying devices in the storage area network.

4. The method of claim 1, wherein the notification identifies each of the one or more paths by a host port world-wide name, an array port world-wide name, and a logical unit number storage world-wide name.

5. The method of claim 1, further comprising:
    disabling, by path management software executing on the one or more hosts, the one or more paths affected by the device outage.

6. The method of claim 5, wherein the path management software automatically disables the one or more paths upon receipt of the notification.

7. The method of claim 5, wherein the path management software disables the one or more paths upon receipt of a user command.

8. A method comprising:
    disabling a device in an enterprise storage system, the disabling comprising:
        detecting a device failure in a storage area network;
        receiving a notification identifying the device that experienced the failure;
        determining one or more paths that are affected by the device failure;
        designating a path of the one or more paths that is operating as being in an alive state;
        designating a path of the one or more paths that is not operating as being in a dead state;
        designating a path of the one or more paths that is not operating as expected as being in a degraded state;
        designating a path of the one or more paths that is experiencing problems and it cannot be determined if the path is in the degraded state or the dead state as being in a warning state;
        generating a notification identifying the one or more paths, the notification comprising the designated state of each of the one or more paths;
        transmitting the notification to one or more hosts; and
        disabling, by path management software executing on the one or more hosts, the one or more paths affected by the device failure.

9. The method of claim 8, wherein the device is an array port, array controller, host bus adapter, switch, or a transmission media.

10. The method of claim 8, further comprising determining the one or more paths by accessing a database of a topology server that stores data identifying devices in the storage area network.

11. The method of claim 8, wherein the notification identifies each of the one or more paths by a host port world-wide name, an array port world-wide name, and a logical unit number storage world-wide name.

12. The method of claim 8, wherein the path management software automatically disables the one or more paths upon receipt of the notification.

13. The method of claim 8, wherein the path management software disables the one or more paths upon receipt of a user command.

14. A system configured to disable a device in an enterprise storage system, the system comprising:
    a storage area network;
    a plurality of hosts;
    a path impact analysis server configured to:
        determine one or more paths impacted by a scheduled device outage;
        designate a path of the one or more paths that is operating as being in an alive state;
        designate a path of the one or more paths that is not operating as being in a dead state;
        designate a path of the one or more paths that is not operating as expected as being in a degraded state;
        designate a path of the one or more paths that is experiencing problems and it cannot be determined if the path is in the degraded state or the dead state as being in a warning state;
        generate a notification identifying the one or more paths, the notification comprising the designated state of each of the one or more paths; and
        transmit the notification to one or more of the plurality of hosts.

15. The system of claim 14, wherein path management software executing on the one or more hosts disables the one or more paths affected by the device outage.

* * * * *